(12) United States Patent
Yamamoto et al.

(10) Patent No.: US 11,214,524 B2
(45) Date of Patent: Jan. 4, 2022

(54) HONEYCOMB STRUCTURE

(71) Applicant: NGK Insulators, Ltd., Nagoya (JP)

(72) Inventors: Hirotaka Yamamoto, Nagoya (JP); Yudai Kurimoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/812,820

(22) Filed: Mar. 9, 2020

(65) Prior Publication Data

US 2020/0308070 A1 Oct. 1, 2020

(30) Foreign Application Priority Data

Mar. 28, 2019 (JP) .............................. JP2019-062341

(51) Int. Cl.
*C04B 38/00* (2006.01)
*B01D 46/24* (2006.01)
(Continued)

(52) U.S. Cl.
CPC ........ *C04B 38/0019* (2013.01); *B01D 46/247* (2013.01); *B01D 46/2455* (2013.01); *B01D 53/94* (2013.01); *C04B 35/565* (2013.01); *C04B 38/0009* (2013.01); *B01D 46/2486* (2021.08); *B01D 2255/9155* (2013.01);
(Continued)

(58) Field of Classification Search
None
See application file for complete search history.

(56) References Cited

U.S. PATENT DOCUMENTS

2004/0055265 A1* 3/2004 Ohno ................. B01D 39/2086
55/523
2011/0237431 A1 9/2011 Ambrosini et al.
(Continued)

FOREIGN PATENT DOCUMENTS

DE 10 2015 104 497 A1 10/2015
EP 1 142 619 A1 10/2001
(Continued)

OTHER PUBLICATIONS

German Office Action (Application No. 10 2020 203 898.8) dated Feb. 11, 2021 (with English translation).

*Primary Examiner* — David Sample
*Assistant Examiner* — Elizabeth Collister
(74) *Attorney, Agent, or Firm* — Burr & Brown, PLLC (57) ABSTRACT

A honeycomb structure includes a plurality of prismatic columnar shaped honeycomb segments; a bonding layer bonding side faces of the honeycomb segments; and a circumferential wall disposed to surround a honeycomb segment bonded body having the honeycomb segments arranged in a grid pattern and bonded with the bonding layer, wherein the honeycomb segments has a porous partition wall disposed to surround a plurality of cells, the cells in other than outermost circumference have a hexagonal shape in a section orthogonal to the cell extending direction, the honeycomb segments include first and second honeycomb segment, the second honeycomb segment is different from the first in at least one of: a shape in the section; a size; and an arrangement direction of the cells and an extended line of one diagonal line imaginarily depicted in the cells in the first honeycomb segment and that in the second are configured to be orthogonal.

8 Claims, 6 Drawing Sheets

(51) Int. Cl.
*B01D 53/94* (2006.01)
*C04B 35/565* (2006.01)
(52) U.S. Cl.
CPC .. *B01D 2279/30* (2013.01); *C04B 2235/3826* (2013.01); *C04B 2235/428* (2013.01)

(56) References Cited

U.S. PATENT DOCUMENTS

| | | | | |
|---|---|---|---|---|
| 2014/0287190 | A1* | 9/2014 | Yamada | F01N 3/2828 428/117 |
| 2015/0252703 | A1* | 9/2015 | Ito | C04B 41/009 428/116 |
| 2015/0275726 | A1 | 10/2015 | Tamai et al. | |
| 2016/0375395 | A1 | 12/2016 | Toyoshima et al. | |
| 2018/0099241 | A1* | 4/2018 | Mori | B01D 46/247 |

FOREIGN PATENT DOCUMENTS

| | | |
|---|---|---|
| WO | 01/23069 A1 | 4/2001 |
| WO | 2010/038245 A1 | 4/2010 |

* cited by examiner

HONEYCOMB STRUCTURE

The present application is an application based on JP 2019-062341 filed on Mar. 28, 2019 with Japan Patent Office, the entire contents of which are incorporated herein by reference.

BACKGROUND OF THE INVENTION

Field of the Invention

The present invention relates to a segmented structured honeycomb structure including a plurality of honeycomb segments bonded with a bonding layer. More particularly the present invention relates to a segmented structured honeycomb structure which exhibits high isostatic strength.

Description of the Related Art

Along with a recent rise in the awareness of environmental issues by the society as a whole, various techniques have been developed in the technical field of generating power by burning fuel, so as to remove harmful components such as nitrogen oxides from exhaust gas that is generated during burning of the fuel. For instance, various techniques have been developed to remove harmful components such as nitrogen oxides from exhaust gas emitted from an automobile engine. To remove such harmful components from exhaust gas, catalyst is typically used to cause a chemical reaction of the harmful substances and convert them into another component that is relatively harmless. A honeycomb structure is used for a catalyst carrier to load the catalyst for exhaust-gas purification.

Exhaust gas emitted from an internal combustion engine by burning contains particulate matters, such as soot, together with toxic gas, such as nitrogen oxides. Hereinafter the particulate matters may be referred to as "PM". The "PM" is an abbreviation of "Particulate Matter". Regulations on the removal of PM emitted from a gasoline engine, for example, are becoming stricter worldwide. A honeycomb structure has been used for a filter to remove such PM. Particularly preferable materials used for the honeycomb structure include ceramic materials, such as silicon carbide (SiC), cordierite, and aluminum titanate (AT), having excellent heat resistance and chemical stability.

Hitherto, as such a honeycomb structure, the honeycomb structure includes a honeycomb structure body having a porous partition wall that defines a plurality of cells which serve as through channels of fluid extending from an inflow end face to an outflow end face, has been proposed. Further, for example, a segmented structured honeycomb structure also has been proposed, which is formed by bonding a plurality of honeycomb segments (see Patent Document 1, for example).

For example, Patent Document 1 discloses the technique of combining a plurality of honeycomb filters to manufacture a single ceramic filter assembly. This ceramic filter assembly is manufactured by bonding the honeycomb filters with a ceramic sealing member layer.

[Patent Document 1] WO 01/23069

SUMMARY OF THE INVENTION

In a conventional segmented structured honeycomb structure, each honeycomb segment has a cell shape (specifically, a cell shape in a cross section orthogonal to the extending direction of the cells) such as quadrangle or hexagon. A segmented structured honeycomb structure made up of honeycomb segments each having a hexagonal cell shape has a problem of low isostatic strength.

For example, a honeycomb structure used for an exhaust-gas purification member is sometimes used by being stored in a can body, such as a metal case. Storing a honeycomb structure in a can body, such as a metal case, may be referred to as canning. When canning of a honeycomb structure, the honeycomb structure is held in a can body by applying a surface pressure to the circumferential surface of the honeycomb structure via a holding material, such as a mat. During such canning, a segmented structured honeycomb structure made up of honeycomb segments each having a hexagonal cell shape may break due to the compressive surface pressure given to the circumferential surface of the honeycomb structure.

In view of such a problem of the conventional techniques, the present invention provides a segmented structured honeycomb structure which exhibits high isostatic strength.

The present invention provides the following honeycomb structure.

According to a first aspect of the present invention, a honeycomb structure is provided including:

a plurality of prismatic columnar shaped honeycomb segments;

a bonding layer mutually bonding side faces of the plurality of honeycomb segments; and a circumferential wall disposed to surround the circumference of a honeycomb segment bonded body having the honeycomb segments arranged in a grid pattern and bonded with the bonding layer, wherein each of the plurality of honeycomb segments has a porous partition wall disposed so as to surround a plurality of cells extending from a first end face to a second end face, in each of the plurality of honeycomb segments, the cells in other than outermost circumference of the honeycomb segment have a hexagonal shape in a section orthogonal to an extending direction of the cells, the plurality of honeycomb segments include at least one first honeycomb segment and at least one second honeycomb segment, in the state of the honeycomb segment bonded body bonded with the bonding layer, the second honeycomb segment is different from the first honeycomb segment in at least one of: a shape of the cells in the section; a size of the cells; and an arrangement direction of the cells to arrange the plurality of cells having the partition wall therebetween, and an extended line of one diagonal line that is imaginarily depicted in the cells having a hexagonal shape in the first honeycomb segment and an extended line of one diagonal line that is imaginarily depicted in the cells having a hexagonal shape in the second honeycomb segment are configured to be orthogonal.

According to a second aspect of the present invention, the honeycomb structure according to the first aspect is provided, wherein a ratio of the number N2 of the second honeycomb segment to the number Nall of all of the honeycomb segments making up the honeycomb segment bonded body is 10 to 50% in percentage.

According to a second aspect of the present invention, the honeycomb structure according to any one of the first or second aspects is provided, wherein in the honeycomb segment bonded body, all of the honeycomb segments disposed adjacent to side faces of the second honeycomb segment are the first honeycomb segments.

According to a second aspect of the present invention, the honeycomb structure according to any one of the first to third aspect is provided, wherein in the honeycomb segment bonded body, the number N2 of the second honeycomb segment is equal to or less than the number N1 of the first honeycomb segment, and when viewing the honeycomb segment bonded body from the first end face side, the second honeycomb segment is present at least in a region of 20% of an outer diameter of the first end face from outermost circumference of the first end face side of the honeycomb segment bonded body.

According to a second aspect of the present invention, the honeycomb structure according to any one of the first to fourth aspects is provided, wherein in the honeycomb segment bonded body, the number N2 of the second honeycomb segment is equal to or less than the number N1 of the first honeycomb segment, and when viewing the honeycomb segment bonded body from the first end face side, the second honeycomb segment is present at least in a region of 40% of an outer diameter of the first end face from a center of gravity at the first end face side of the honeycomb segment bonded body.

According to a second aspect of the present invention, the honeycomb structure according to any one of the first to third aspects is provided, wherein in the honeycomb segment bonded body, the number N2 of the second honeycomb segment is equal to or less than the number N1 of the first honeycomb segment, and when viewing the honeycomb segment bonded body from the first end face side, the second honeycomb segment is present only in a region of 20% of an outer diameter of the first end face from outermost circumference of the first end face side of the honeycomb segment bonded body.

According to a second aspect of the present invention, the honeycomb structure according to any one of the first to sixth aspects is provided, wherein in each of the plurality of honeycomb segments, the cells in other than outermost circumference of the honeycomb segment have a regular hexagonal shape in a section orthogonal to the extending direction of the cells.

According to a second aspect of the present invention, the honeycomb structure according to any one of the first to seventh aspects is provided, wherein in the honeycomb segment bonded body, when viewing the honeycomb segment bonded body from the first end face side, the honeycomb segments other than the honeycomb segments placed at outermost circumference of the honeycomb segment bonded body have a quadrangular shape or a hexagonal shape.

The honeycomb structure of the present invention provides an effect that exhibits high isostatic strength. The honeycomb structure of the present invention therefore effectively suppresses a breakage due to compressive surface pressure applied to the honeycomb structure when the honeycomb structure is housed in a can body as a housing, for example.

DESCRIPTION OF THE PREFERRED EMBODIMENTS

The following describes embodiments of the present invention. However, the present invention is not limited to the following embodiments. The present invention is therefore to be understood to include the following embodiments, to which modifications and improvements are added as needed based on the ordinary knowledge of a person skilled in the art without departing from the scope of the present invention.

(1) Honeycomb Structure:

As shown in FIGS. 1 to 4, a honeycomb structure that is one embodiment of the present invention is a honeycomb structure 100 including a plurality of honeycomb segments 4, a bonding layer 14, and a circumferential wall 13. The honeycomb structure 100 of the present embodiment is a so-called segmented structured honeycomb structure 100.

Figure 1:
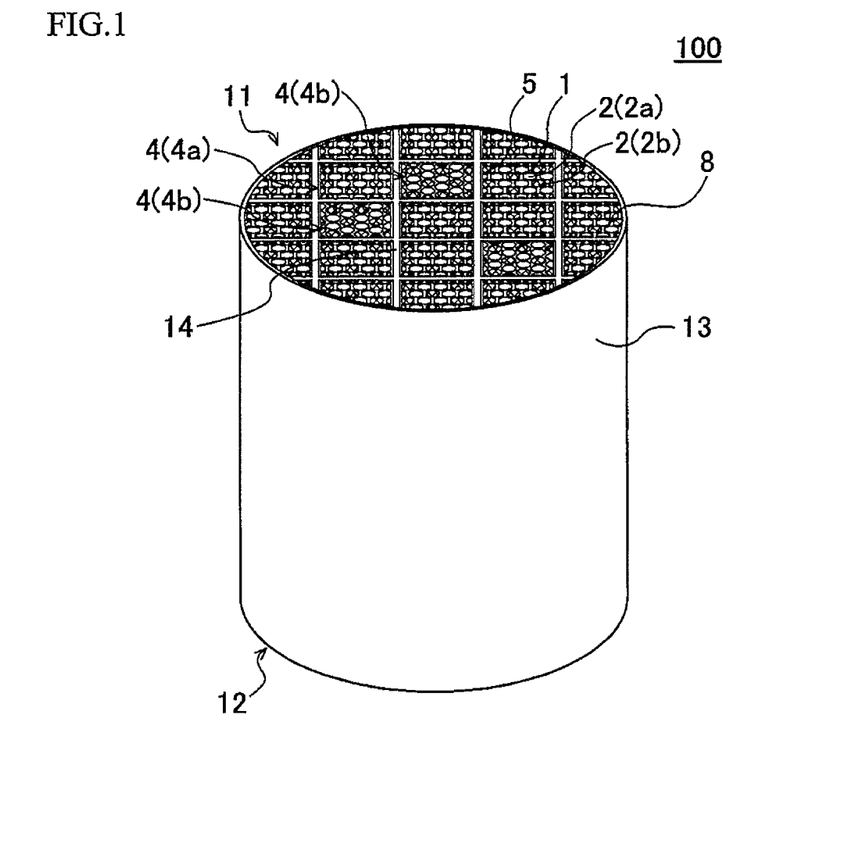
FIG. 1 is a perspective view schematically showing one embodiment of the honeycomb structure of the present invention viewed from the first end face side.
Figure 2:
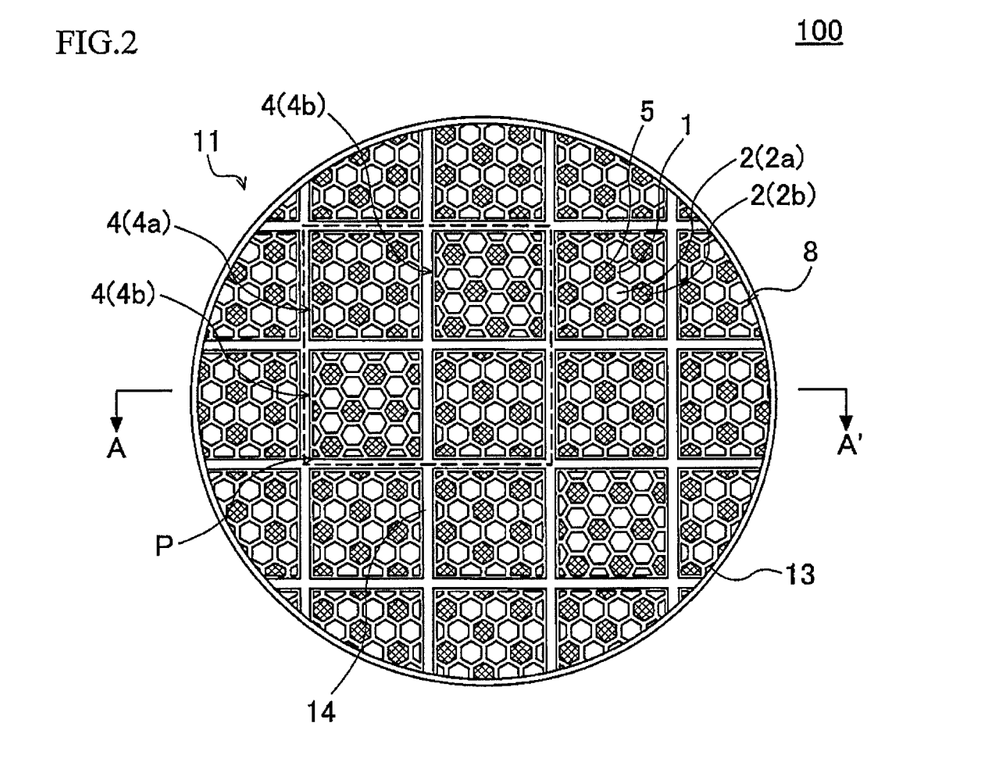
FIG. 2 is a plan view schematically showing the first end face of the honeycomb structure of FIG. 1.
Figure 3:
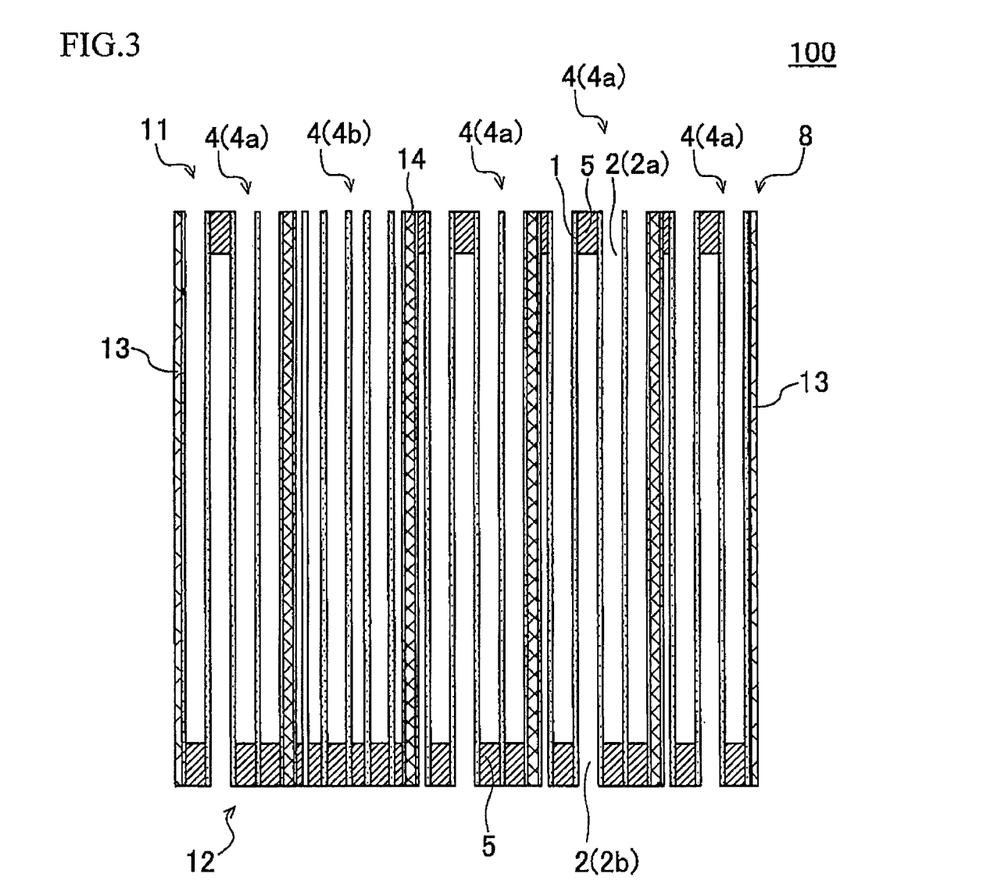
FIG. 3 is a sectional view schematically showing a section taken along the line A-A' of FIG. 2.
Figure 4:
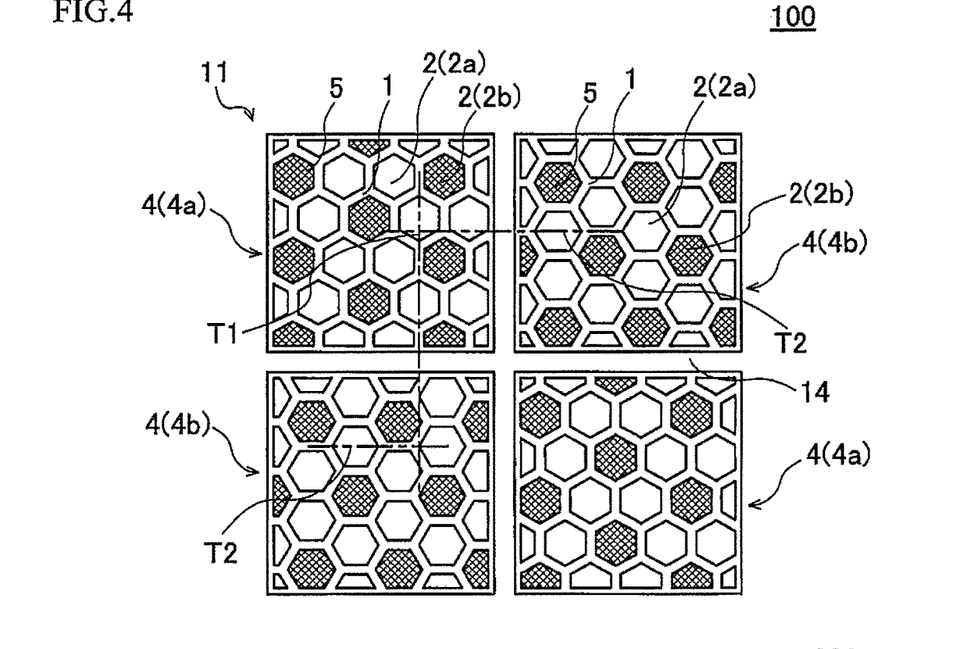
FIG. 4 is a partially enlarged plan view showing an enlarged part P in FIG. 2.

FIG. 1 is a perspective view schematically showing one embodiment of the honeycomb structure of the present invention viewed from a first end face side. FIG. 2 is a plan view schematically showing the first end face of the honeycomb structure of FIG. 1. FIG. 3 is a sectional view schematically showing a section taken along the line A-A' of FIG. 2. FIG. 4 is a partially enlarged plan view showing an enlarged part P in FIG. 2.

Each of the plurality of honeycomb segments 4 has a porous partition wall 1 disposed so as to surround a plurality of cells 2 extending from a first end face 11 to a second end face 12. Each honeycomb segment 4 is configured to further have a segment outer wall at the circumferential part so that the overall shape of the honeycomb segment is prismatic columnar, for example. In the present invention, the cells 2 refer to a space surrounded with the partition wall 1.

The plurality of honeycomb segments 4 is bonded at their side faces via a bonding layer 14. Hereinafter a bonded body having the plurality of honeycomb segments 4 bonded via the bonding layer 14 may be referred to as "honeycomb segment bonded body 8". In the honeycomb structure 100, the plurality of honeycomb segments 4 are bonded with the bonding layer 14 in a grid pattern so as to form the honeycomb segment bonded body 8. The circumferential wall 13 is disposed so to as surround the circumference of this honeycomb segment bonded body 8.

In each of the plurality of honeycomb segments 4, the cells 2 in other than the outermost circumference of the honeycomb segment 4 have a hexagonal shape in a cross section orthogonal to the extending direction of the cells 2. The shape of the cells 2 formed in the honeycomb segment 4 may be a regular hexagon as an example of shown in FIG. 1 to FIG. 4, or may be hexagonal shapes other than a regular hexagon as long as they have a hexagonal shape. In the honeycomb structure 100 of the present embodiment, the shape of the cells 2 is preferably a regular hexagon. Hereinafter the "shape of the cells" in a section orthogonal to the extending direction of the cells 2 may be referred to as "sectional shape of the cells" or simply a "shape of the cells". A "hexagon" in the descriptions means a hexagonal shape, a hexagonal shape in which at least one corner of the hexagon is formed in a curved shape, and a hexagonal shape in which at least one corner of the hexagon is linearly chamfered.

The plurality of honeycomb segments 4 includes first honeycomb segments 4a and second honeycomb segments 4b. The second honeycomb segments 4b are different from the first honeycomb segments 4a in at least one of the following configurations in the state of the honeycomb segment bonded body 8 bonded with the bonding layer 14. The configurations include: the shape of the cells 2 in a section orthogonal to the extending direction of the cells 2; the size of the cells 2; and the arrangement direction of the cells 2 where a plurality of cells 2 are arranged having the partition wall 1 therebetween. In one example, the second honeycomb segments 4b and the first honeycomb segments 4a in the honeycomb structure 100 shown in FIG. 1 to FIG. 4 are different in their "arrangement direction of the cells 2". In the honeycomb structure 100 shown in FIG. 1 to FIG. 4, the second honeycomb segments 4b and the first honeycomb segments 4a are the same in their shape of the cells 2 and size of the cells 2. When viewing the honeycomb segment bonded body 8 from the first end face 11 side, each second honeycomb segment 4b is bonded with other honeycomb segments 4 via the bonding layer 14 in a state rotated by 90° clockwise with respect to the arrangement of a first honeycomb segment 4a. Specifically, in each of the honeycomb segments 4 in which cells 2 having a hexagonal shape are formed, the cells 2 do not have 90° rotational symmetries in the arrangement direction. Then one of the honeycomb segments 4 in the honeycomb segment bonded body 8 is rotated by 90° clockwise, so that the arrangement direction of the cells 2 in the one honeycomb segment 4 can be different from in other honeycomb segments 4. In one example as described above, the "one honeycomb segment 4" rotated by 90° corresponds to the second honeycomb segment 4b, and the "other honeycomb segments 4" not rotated by 90° correspond to the first honeycomb segments 4a. In the honeycomb structure 100 of the present embodiment, to distinguish the first honeycomb segments 4a and the second honeycomb segments 4b, the number N2 of the second honeycomb segments 4b is equal to or less than the number N1 of the first honeycomb segments 4a.

The honeycomb structure 100 further has the following configuration as another major configuration. As shown in FIG. 4, the extended line of one diagonal line imaginarily depicted in the cells 2 having a hexagonal shape of the first honeycomb segment 4a is referred to as "extended line T1 of diagonal line". The extended line of one diagonal line imaginarily depicted in the cells 2 having a hexagonal shape of the second honeycomb segment 4b is referred to as "extended line T2 of diagonal line". The honeycomb structure 100 of the present embodiment is configured so that the "extended line T1 of diagonal line" in the first honeycomb segment 4a is orthogonal to the "extended line T2 of diagonal line" in the second honeycomb segment 4b. The following may refer to a "one diagonal line imaginarily depicted in a cell 2" simply as a "one diagonal line depicted in a cell 2" or a "one diagonal line of a cell 2".

The honeycomb structure 100 having the above configuration shown in FIG. 1 to FIG. 4 provides an effect that exhibits high isostatic strength. In each of the honeycomb segments 4 in which cells 2 having a hexagonal shape are formed, the cells 2 do not have 90° rotational symmetries in the arrangement direction. This means that each of the prismatic columnar honeycomb segments 4 has different mechanical strengths among its side faces. Specifically the partition wall 1 in contact with the segment outer wall is disposed having an acute angle or an obtuse angle with the segment outer wall. The side face of the honeycomb segment having a lot of parts of the partition wall 1 disposed at an acute angle with the segment outer wall tends to have a reduced mechanical strength. In the honeycomb structure 100 of the present embodiment, the honeycomb segment bonded body 8 includes the first honeycomb segments 4a and the second honeycomb segments 4b so that the "extended line T1 of diagonal line" is orthogonal to the "extended line T2 of diagonal line". Therefore, the honeycomb segment bonded body 8 as a whole, that is, the honeycomb structure 100 as a whole, enables stress relaxation of external stress. Even when, for example, the first honeycomb segments 4a and the second honeycomb segments 4b as individual honeycomb segments 4 have the same cell structure or are made of the same materials, the honeycomb structure can improve the isostatic strength as compared with the conventional honeycomb structures.

The "extended line T1 of diagonal line is orthogonal to the extend line T2 of diagonal line" in the descriptions means that the extended line T1 of diagonal line and the extended line T2 of diagonal line intersect at 90°±4°. In the honeycomb structure 100 of the present embodiment, a first honeycomb segment 4a and a second honeycomb segment 4b may be configured to have at least a pair of diagonal lines having extended lines that are orthogonal. Specifically, the extended line T1 of at least one diagonal line among the diagonal lines depicted in the cells 2 of the first honeycomb segment 4a and the extended line T2 of at least one diagonal line among the diagonal lines depicted in the cells 2 of the second honeycomb segment 4b may be configured to be orthogonal.

The honeycomb structure 100 shown FIG. 1 to FIG. 4 has a plugging portion 5 to plug open ends of the cells 2 on any one of the first end face 11 side and the second end face 12 side. In one example, the honeycomb structure has an inflow end face that is the first end face 11 side through which exhaust gas flows in and an outflow end face that is the second end face 12 side through which exhaust gas flows out. In this case, the plurality of cells 2 includes inflow cells 2a and outflow cells 2b. For instance, the cells 2 having the plugging portion 5 at the ends of the second end face 12 side may be referred to as "inflow cells 2a". The cells 2 having the plugging portion 5 at the ends of the first end face 11 side may be referred to as "outflow cells 2b". The honeycomb structure 100 of the present embodiment may not have the plugging portion 5 as stated above. The "plugging portion 5" in the honeycomb structure 100 of the present embodiment is optional component, and the cells 2 in each honeycomb segment 4 may open at both of the open ends of the first end face 11 side and of the second end face 12 side. When the honeycomb structure 100 shown in FIG. 1 to FIG. 4 has the plugging portion 5, such a honeycomb structure is preferably used as a filter to trap PM included in exhaust gas, for example. When the honeycomb structure 100 does not have the plugging portion 5, the honeycomb structure is preferably used as a catalyst carrier to be loaded with catalyst for exhaust-gas purification.

The ratio of the number N2 of the second honeycomb segments 4b to the total number Nall of the honeycomb segments 4 making up the honeycomb segment bonded body 8 is preferably 10 to 50% in percentage, and is more preferably 25 to 50%. Such a configuration more effectively improves the isostatic strength. If the above-stated ratio (number N2/total number Nall) is less than 10% in percentage, the sufficient effect of improving isostatic strength may not be obtained. Since the number N2 of the second honeycomb segments 4b is equal to or less than the number N1 of the first honeycomb segments 4a, the upper limit of the above-stated ratio (number N2/total number Nall) in percentage is 50%.

In the honeycomb segment bonded body 8, all of the honeycomb segments 4 disposed adjacent to side faces of a second honeycomb segment 4b are preferably the first honeycomb segments 4a. In this case, the extended line T2 of a single diagonal line depicted in the cells 2 of the second honeycomb segment 4b will be orthogonal to the extended line T1 of a single diagonal line depicted in the cells 2 of each of the honeycomb segments 4 adjacent to the second honeycomb segment 4b. This configuration improves the mechanical strength of the honeycomb structure 100 uniformly, and so the honeycomb structure 100 has higher isostatic strength.

When viewing the honeycomb segment bonded body 8 from the first end face 11 side, the second honeycomb segment 4b is preferably present at least in the region that is 20% of the outer diameter of the first end face 11 from the outermost circumference of the first end face 11 side of the honeycomb segment bonded body 8. Such a configuration effectively improves the isostatic strength. When viewing the honeycomb segment bonded body 8 from the first end face 11 side, the second honeycomb segment 4b may be present only in the region that is 20% of the outer diameter of the first end face 11 from the outermost circumference of the first end face 11 side of the honeycomb segment bonded body 8. Such a configuration is preferable because it improves the isostatic strength, and enables homogeneous distribution of exhaust gas flowing at the center of the end face. As described above, the number N2 of the second honeycomb segments 4b in the honeycomb segment bonded body 8 is equal to or less than the number N1 of the first honeycomb segments 4a.

When viewing the honeycomb segment bonded body 8 from the first end face 11 side, the second honeycomb segment 4b may be present at least in the region that is 40% of the outer diameter of the first end face 11 from the center of the gravity at the first end face 11 side of the honeycomb segment bonded body 8. For the use of the honeycomb structure 100 as a member for exhaust-gas purification, a lot of exhaust gas tends to flow near the center and not near the outer circumference of the honeycomb structure 100. The above configuration of the honeycomb structure 100 allows exhaust gas a lot near the outer circumference of the first end face 11 because it includes the second honeycomb segments 4b as well as the first honeycomb segments 4a near the center where exhaust gas easily flows. This configuration disturbs the flow of exhaust gas near the center, and so the effect of improving the purifying performance also is expected when the honeycomb structure is loaded with catalyst for exhaust-gas purification.

The thickness of the partition wall 1 of each honeycomb segment 4 is not limited especially. The thickness of the partition wall 1 of each honeycomb segment 4 is preferably 100 to 400 μm, more preferably 150 to 360 μm, and particularly preferably 200 to 300 μm, for example. This configuration suppresses an increase in pressure loss while keeping the isostatic strength. Preferably each of the honeycomb segments 4 in the honeycomb structure 100 of the present embodiment has a uniform thickness of the partition wall 1. Such a configuration is preferable because it enables homogeneous flowing of exhaust gas in the honeycomb segment 4.

The cell density of each honeycomb segment 4 is not limited especially. Each honeycomb segment 4 preferably has a cell density of 15 to 95 cells/cm$^2$, more preferably 30 to 60 cells/cm$^2$, and particularly preferably 30 to 50 cells/cm$^2$, for example. This configuration suppresses an increase in pressure loss while keeping the isostatic strength.

The hydraulic diameter of the cells 2 in each honeycomb segment 4 is preferably 0.9 to 2.3 mm, more preferably 1.2 to 1.7 mm, and particularly preferably 1.4 to 1.6 mm. Such a configuration easily has an advantageous effect of lowering pressure loss while keeping the isostatic strength. The hydraulic diameter is a calculated value based on the sectional area and the circumferential length of each cell 2 by 4×(sectional area)/(circumferential length).

The porosity of the partition wall 1 of each honeycomb segment 4 is not limited especially. The porosity of the partition wall 1 of each honeycomb segment 4 is preferably 30 to 80%, more preferably 35 to 75%, and particularly preferably 40 to 70%, for example. If the porosity of the partition wall 1 is less than 30%, the pressure loss may increase. If the porosity of the partition wall 1 exceeds 80%, the strength of the honeycomb structure 100 is not enough. When such a honeycomb structure 100 is stored in a can body used for an exhaust-gas purifying apparatus, it is difficult to hold the honeycomb structure 100 with a sufficient grip force. The porosity of the partition wall 1 is a value measured with a mercury porosimeter. For the mercury porosimeter, Autopore 9500 (product name) produced by Micromeritics Co. may be used, for example.

From the viewpoints of strength, heat resistance, durability, and the like, the partition wall 1 is preferably made of various types of ceramics, such as oxides and non-oxides, and metals as major components. Specifically, ceramics preferably include at least one type of materials selected from the group consisting of cordierite, mullite, alumina, spinel, silicon carbide, silicon nitride, and aluminum titanate. Examples of the metals include Fe—Cr—Al based metals and metal silicon. Preferably, one type or two types or more selected from these materials are included as a major component. Particularly preferably, one type or two types or more selected from the group consisting of alumina, mullite, aluminum titanate, cordierite, silicon carbide, and silicon nitride is included as a major component from the viewpoints of high strength and high heat resistance. The ceramic material may be a composite material obtained by binding silicon carbide particles with cordierite as a binder, for example. Silicon carbide or silicon-silicon carbide composite materials are particularly suitable from the viewpoints of high heat conductivity and high heat resistance, and the like. The "major component" refers to a component making up 50 mass % or more of the components, preferably 70 mass % or more, and more preferably 80 mass % or more.

The material of the plugging portion 5 is not limited especially, and an above-mentioned material for the partition wall 1 can be used suitably.

The shape of each honeycomb segment 4 is not limited especially. For example, when viewing the honeycomb segment bonded body 8 from the first end face 11 side, the honeycomb segments 4 other than the honeycomb segments 4 disposed at the outermost circumference of the honeycomb segment bonded body 8 preferably have a quadrangular or hexagonal shape. In one example, in the honeycomb structure 100 shown in FIG. 1 to FIG. 4, the honeycomb segment 4 other than the honeycomb segments 4 disposed at the outermost circumference have a quadrangular shape. Such a honeycomb segment 4 has a prismatic columnar shape that is a quadrangle in the first end face 11 and the second end face 12. Each of the honeycomb segments 4 disposed at the outermost circumference has a pillar shape having a part of the prismatic columnar honeycomb segment 4 machined, such as grinding, along the shape of the circumferential wall 13 in accordance with the overall shape of the honeycomb structure 100. The shape of these honeycomb segments before the machining includes a triangle, a quadrangle, and a hexagon, for example.

The overall shape of the honeycomb structure 100 is not limited especially. For the overall shape of the honeycomb structure 100, the shape of the first end face 11 and the second end face 12 is preferably circular or elliptical, and particularly preferably circular. The size of the honeycomb structure 100 is not limited especially, and the length from the first end face 11 to the second end face 12 is preferably 100 to 440 mm. When the overall shape of the honeycomb structure 100 is round pillar-shaped, the diameters of the first end face 11 and the second end face 12 are preferably 50 to 360 mm.

The honeycomb structure 100 is suitably used as a member for exhaust-gas purification of an internal combustion engine. In the honeycomb structure 100, at least one of the surface of the partition wall 1 and the pores of the partition wall 1 of the honeycomb segments 4 may be loaded with catalyst for exhaust-gas purification.

Figure 5:
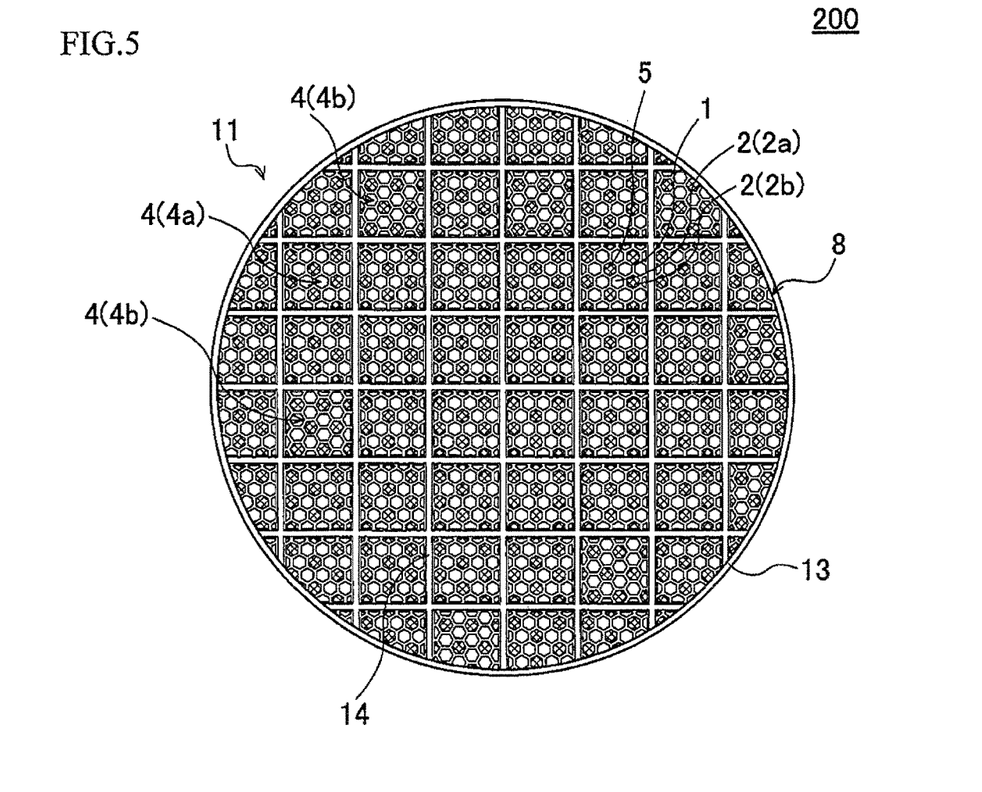
FIG. 5 is a plan view schematically showing a first end face of another embodiment of the honeycomb structure of the present invention.

Next the following describes another embodiment of the honeycomb structure of the present invention, with reference to FIG. 5. FIG. 5 is a plan view schematically showing a first end face of another embodiment of the honeycomb structure of the present invention. In the following descriptions on the honeycomb structure 200 shown in FIG. 5, like numerals indicate like components of the honeycomb structure 100 shown in FIG. 1 to FIG. 4, and their descriptions may be omitted.

The honeycomb structure 200 shown in FIG. 5 includes a plurality of honeycomb segments 4, a bonding layer 14, and a circumferential wall 13. Each of the plurality of honeycomb segments 4 has a porous partition wall 1 disposed so as to surround a plurality of cells 2 extending from a first end face 11 to a second end face 12.

In each of the plurality of honeycomb segments 4, the cells 2 in other than the outermost circumference of the honeycomb segment 4 have a regular hexagonal shape in a section orthogonal to the extending direction of the cells 2. The plurality of honeycomb segments 4 include first honeycomb segments 4a and second honeycomb segments 4b. The second honeycomb segments 4b and the first honeycomb segments 4a are different in their "arrangement direction of the cells 2". Similarly to the honeycomb structure 100 of FIG. 4, the honeycomb structure 200 of the present embodiment is configured so that the "extended line T1 of diagonal line (see FIG. 4)" in the first honeycomb segments 4a is orthogonal to the "extended line T2 of diagonal line (see FIG. 4)" in the second honeycomb segments 4b.

When viewing the honeycomb segment bonded body 8 of the honeycomb structure 200 from the first end face 11 side, the second honeycomb segments 4b are present only in the region that is 20% of the outer diameter of the first end face 11 from the outermost circumference of the first end face 11 side of the honeycomb segment bonded body 8.

Figure 6:
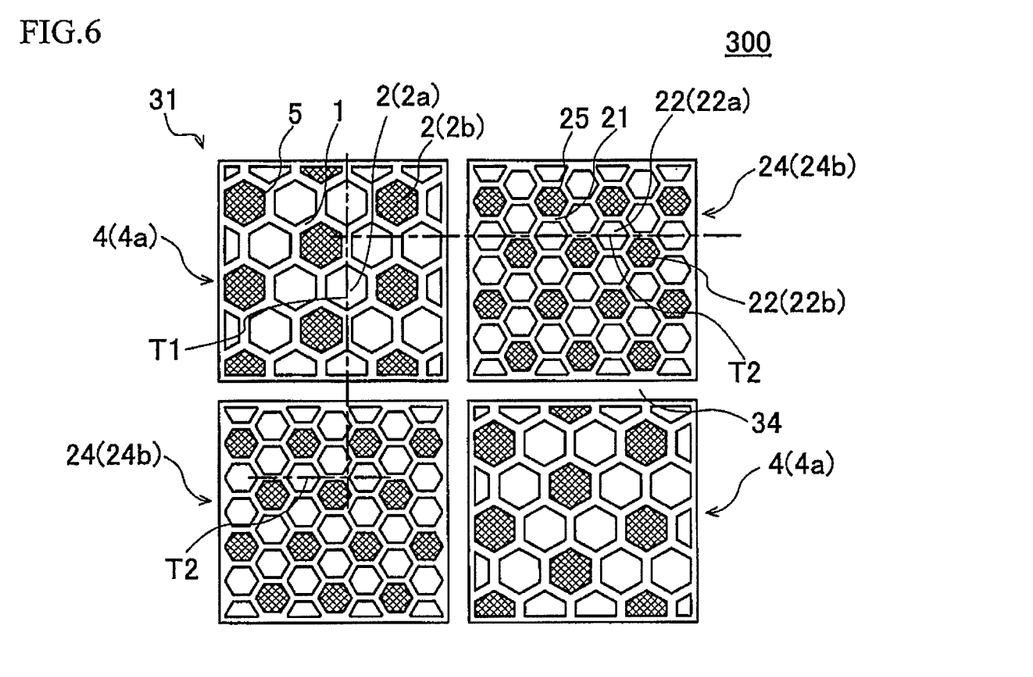
FIG. 6 is a partially enlarged plan view schematically showing a part of the first end face of still another embodiment of the honeycomb structure of the present invention.
Figure 7:
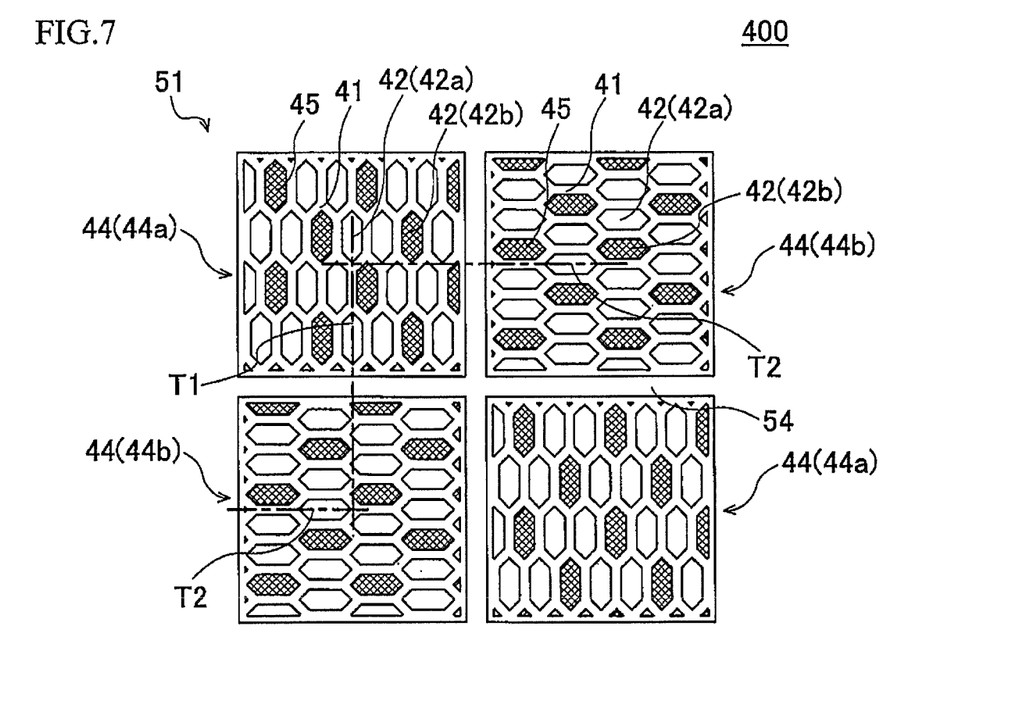
FIG. 7 is a partially enlarged plan view schematically showing a part of the first end face of yet another embodiment of the honeycomb structure of the present invention.
Figure 8:
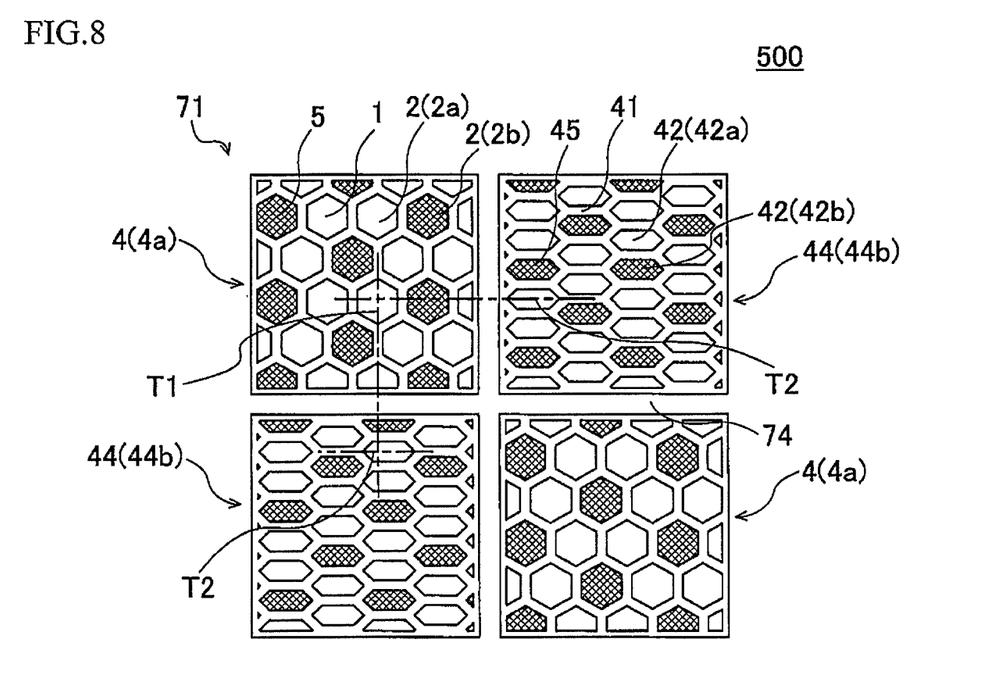
FIG. 8 is a partially enlarged plan view schematically showing a part of the first end face of yet another embodiment of the honeycomb structure of the present invention.

Next, referring next to FIG. 6 to FIG. 8, the following describes still other embodiments of the honeycomb structure of the present invention. FIG. 6 to FIG. 8 are partially enlarged plan views schematically showing a part of the first end face of still other embodiments of the honeycomb structure of the present invention. In the following descriptions on the honeycomb structure 300, 400, and 500 shown in FIG. 6 to FIG. 8, like numerals indicate like components of the honeycomb structure 100 shown in FIG. 1 to FIG. 4, and their descriptions may be omitted.

The honeycomb structure 300 shown in FIG. 6 includes a plurality of honeycomb segments 4, 24, a bonding layer 34, and a circumferential wall (not shown). Each of the honeycomb segments 4 has a porous partition wall 1 disposed so as to surround a plurality of cells 2 extending from a first end face 31 to a second end face (not shown). Each of the honeycomb segments 24 has a porous partition wall 21 disposed so as to surround a plurality of cells 22 extending from a first end face 31 to a second end face (not shown).

In each of the honeycomb segments 4, the cells 2 in other than the outermost circumference of the honeycomb segment 4 have a regular hexagonal shape in a section orthogonal to the extending direction of the cells 2. In each of the honeycomb segments 24, the cells 22 in other than the outermost circumference of the honeycomb segment 24 have a regular hexagonal shape in a section orthogonal to the extending direction of the cells 22. The cells 22 having a regular hexagonal shape in the honeycomb segment 24 are configured to have a smaller open area than that of the cells 2 having a regular hexagonal shape in the honeycomb segment 4. In FIG. 6, reference numerals 5 and 25 denote plugging portions. Reference numerals 2a and 22a denote inflow cells, and 2b and 22b denote outflow cells.

In the honeycomb structure 300 shown in FIG. 6, the honeycomb segments 4 correspond to first honeycomb segments 4a and the honeycomb segments 24 correspond to second honeycomb segments 24b. The first honeycomb segments 4a and the second honeycomb segments 24b are different in their "size of the cells 2 and 22". Similarly to the honeycomb structure 100 shown in FIG. 4, the honeycomb structure 300 is configured so that the "extended line T1 of diagonal line" in the first honeycomb segment 4a is orthogonal to the "extended line T2 of diagonal line" in the second honeycomb segment 24b.

The honeycomb structure 400 shown in FIG. 7 includes a plurality of honeycomb segments 44, a bonding layer 54, and a circumferential wall (not shown). Each of the plurality of honeycomb segments 44 has a porous partition wall 41 disposed so as to surround a plurality of cells 42 extending from a first end face 51 to a second end face (not shown).

In each of the plurality of honeycomb segments 44, the cells 42 in other than the outermost circumference of the honeycomb segment 44 have a long hexagonal shape in a section orthogonal to the extending direction of the cells 42. The plurality of honeycomb segments 44 includes first honeycomb segments 44a and second honeycomb segments 44b. The second honeycomb segments 44b and the first honeycomb segments 44a are different in their "arrangement direction of the cells 42". Similarly to the honeycomb structure 100 shown in FIG. 4, the honeycomb structure 400 of the present embodiment is configured so that the "extended line T1 of diagonal line" in the first honeycomb segments 44a is orthogonal to the "extended line T2 of diagonal line" in the second honeycomb segments 44b. In FIG. 7, reference numeral 45 denotes a plugging portion. Reference numeral 42a denotes an inflow cell, and 42b denotes an outflow cell.

The honeycomb structure 500 shown in FIG. 8 includes a plurality of honeycomb segments 4, 44, a bonding layer 74, and a circumferential wall (not shown). Each of the honeycomb segments 4 has a porous partition wall 1 disposed so as to surround a plurality of cells 2 extending from a first end face 71 to a second end face (not shown). Each of the honeycomb segments 44 has a porous partition wall 41 disposed so as to surround a plurality of cells 42 extending from a first end face 71 to a second end face (not shown).

In each of the honeycomb segments 4, the cells 2 in other than the outermost circumference of the honeycomb segment 4 have a regular hexagonal shape in a section orthogonal to the extending direction of the cells 2. In each of the honeycomb segments 44, the cells 42 in other than the outermost circumference of the honeycomb segment 44 have a long hexagonal shape in a section orthogonal to the extending direction of the cells 42. In FIG. 8, reference numerals 5 and 45 denote plugging portions. Reference numerals 2a and 42a denote inflow cells, and 2b and 42b denote outflow cells.

In the honeycomb structure 500 shown in FIG. 8, the honeycomb segments 4 correspond to first honeycomb segments 4a and the honeycomb segments 44 correspond to second honeycomb segments 44b. The first honeycomb segments 4a and the second honeycomb segments 44b are different in their "shape of the cells 2 and 42". Similarly to the honeycomb structure 100 shown in FIG. 4, the honeycomb structure 500 is configured so that the "extended line T1 of diagonal line" in the first honeycomb segments 4a is orthogonal to the "extended line T2 of diagonal line" in the second honeycomb segments 44b.

Similarly to the honeycomb structure 100 shown in FIG. 1 to FIG. 3, the honeycomb structures 200, 300, 400, and 500 described above shown in FIG. 5 to FIG. 8 provide an effect that exhibits high isostatic strength.

(2) Method for Manufacturing a Honeycomb Structure:

There is no particular limitation on the method for manufacturing the honeycomb structures of the above embodiments, and these honeycomb structures can be manufactured by the following method, for example. First, a plastic kneaded material for producing a honeycomb segment is prepared. The kneaded material for producing the honeycomb segment can be prepared by adding additives, such as binder, and water, as needed, to a material selected from the aforementioned materials suitable for the honeycomb segment as raw material powder.

Next, the prepared kneaded material is extruded so as to produce a prismatic columnar honeycomb formed body having a partition wall surrounding a plurality of cells and a segment outer wall disposed at the outermost circumference. The cells in each honeycomb formed body have a hexagonal shape. When the honeycomb structure made up of two types of honeycomb segments is manufactured, two types of dies for extrusion may be prepared to manufacture two types of honeycomb formed bodies.

The obtained honeycomb formed body is then dried by microwaves and hot air, for example. A plugging portion may be formed as needed by plugging the open ends of the cells with a material similar to the material used for producing the honeycomb formed body. After forming the plugging portion, the honeycomb formed body may be dried again.

Next the honeycomb formed body is fired to obtain a honeycomb segment. Firing temperatures and firing atmosphere differ according to the raw material, and those skilled in the art can select the firing temperature and the firing atmosphere that are the most suitable for the selected material.

Next, the side faces of the plurality of honeycomb segments are bonded mutually with a bonding material. At this time, when the honeycomb structure made up of one type of honeycomb segments is manufactured, at least one of the honeycomb segments is rotated by 90° clockwise with respect to the arrangement of other honeycomb segments, and then these honeycomb segments are bonded. Thus, the honeycomb segment rotated by 90° corresponds to the second honeycomb segment. The honeycomb segments that are not rotated by 90° correspond to the first honeycomb segments. When the honeycomb structure made up of two types of honeycomb segments is manufactured, the side faces of these honeycomb segments are bonded while arranging the honeycomb segments so that the extended line of one diagonal line of the cells in one of the two types of the honeycomb segments is orthogonal to the extended line of one diagonal line of the cells in the other type of honeycomb segment. The bonding material may be prepared by adding liquid medium such as water to a ceramics material to be in a paste form or in a slurry form.

Next, the bonded body of the honeycomb segments is machined at the circumference part to have a desired shape, whereby a honeycomb structure is manufactured.

Cells are exposed in the machined face after the machining of the circumference of the bonded body of honeycomb segments. The method may apply a circumference coating material to the machined face of the bonded body of the honeycomb segments to form a circumferential wall. The circumference coating material may be prepared, for example, by adding an additive such as, organic binder, foamable resin or dispersing agent, and water to inorganic raw materials including inorganic fiber, colloidal silica, clay, ceramic particles, followed by kneading to be in a slurry form.

EXAMPLES

The following describes the present invention more specifically by way of examples, and the present invention is not limited at all by these examples.

Example 1

As the ceramics raw material, silicon carbide (SIC) powder and metal silicon (Si) powder were mixed at the mass ratio of 80:20 to prepare a mixed raw material. Hydroxypropylmethyl cellulose as binder and water absorbable resin as pore former were added to this mixed raw material, to which water was added. In this way a forming raw material was manufactured. The obtained forming raw material was kneaded with a kneader to obtain a kneaded material.

Next, the obtained kneaded material was formed using a vacuum extruder to produce sixty honeycomb formed bodies each having a quadrangular-prism shape. The cells of each honeycomb formed body had a regular hexagonal shape.

Next, the obtained honeycomb formed bodies were heated and dried by high-frequency induction heating, followed by drying at 120° C. for 2 hours by a hot-air drier.

Next, a plugging portion was formed at each of the dried honeycomb formed bodies. First, a mask was provided to the first end face of the dried honeycomb formed body. Next, slurry for plugging was applied to the masked end part (the end part of the first end face) to fill the open ends of the cells without the mask (outflow cells) with the slurry for plugging. In this way, a plugging portion was formed at the first end face side of the dried honeycomb formed body. Then, a plugging portion was formed at the inflow cells as well similarly on the second end face of the dried honeycomb formed body.

Then each honeycomb formed body having the plugging portion formed was degreased and fired. In this way, honeycomb segments were obtained. Degreasing was performed at 550° C. for 3 hours, and firing was performed at 1450° C. for 2 hours in an argon atmosphere.

In this way, honeycomb segments used to manufacture a honeycomb structure of Example 1 were manufactured. Each honeycomb segment had a section orthogonal to the axial direction that was square in shape, and the length of one side of the square (segment size) was 39 ram. The honeycomb segment had the length in the axial direction of 304.8 mm. Each of the honeycomb segments had the thickness of the partition wall of 300 μm, and had the cell density of 47 cells/cm$^2$.

Next, a bonding material to bond the honeycomb segments was prepared. The bonding material used was prepared by adding organic binder, foamable resin and dispersing agent as additives to inorganic raw materials to make up the bonding layer, and adding water thereto, followed by kneading to be in the slurry form.

Next, the obtained honeycomb segments were disposed so that their side faces were opposed mutually, and were bonded with a bonding material. In the bonded body of the honeycomb segments, the honeycomb segments were arranged 8 in columns and 8 in rows on the end faces. The "total number Nall (pieces)" and the "arrangement (columns×rows)" in the "honeycomb segment" in Table 1 show the total number of honeycomb segments and their arrangement in Examples. For instance, "8×8" in the field of "arrangement (columns×rows)" means that the honeycomb segments were arranged 8 in columns and 8 in rows.

In Example 1, honeycomb segments placed at the positions described below were rotated by 90° clockwise with respect to the arrangement of other honeycomb segments, and then these honeycomb segments were bonded. These honeycomb segments rotated by 90° clockwise correspond to the second honeycomb segments. In accordance with the description of "arrangement (columns×rows)" of the honeycomb segments as stated above, the second honeycomb segments were arranged, and a honeycomb segment placed at one of the corners among the honeycomb segments arranged 8 in columns and 8 in rows is shown as "1-1". The one corner refers to the vertically (up/down direction) lowermost corner and the horizontally (left/right direction) leftmost corner when viewing the honeycomb segment bonded body from one end face side. For instance, the vertically (upward) fourth and the horizontally (to the right) third honeycomb segment from the honeycomb segment located at "1-1" is indicated as "4-3". In Example 1, the honeycomb segments located at "3-3", "3-7", "4-6", "5-4", "6-3", and "6-6" were rotated by 90° clockwise, and were bonded.

Next, the honeycomb segment bonded body was grounded at the circumference to have a round pillar shape, and a coating material was applied to the circumferential face, whereby the honeycomb structure of Example 1 was obtained. The honeycomb structure of Example 1 had the diameter of the end face of 304.8 mm. Table 1 and Table 2 show the structures of the honeycomb structure, the first honeycomb segments, and the second honeycomb segments.

In Table 2, "number at circumferential part (outer diameter 20%)" indicates the number of the second honeycomb segments located at the circumferential part of the honeycomb segment bonded body. The "circumference part" means a region of 20% of the outer diameter of the first end face from the outermost circumference of the first end face side of the honeycomb segment bonded body.

In Table 2, "number at center part (outer diameter 40%)" indicates the number of the second honeycomb segments located at the center part of the honeycomb segment bonded body. The "center part" means a region of 40% of the outer diameter of the first end face from the center of the gravity at the first end face side of the honeycomb segment bonded body.

TABLE 1

| | | | | | | honeycomb segment | | | | | |
| | | | | 1st honeycomb segment | | | | 2nd honeycomb segment | | | |
| | honeycomb structure diameter (mm) | total number Nall (pieces) | arrangement (columns' rows) | number N1 (pieces) | cell shape | partition-wall thickness (μm) | cell density (cells/cm$^2$) | number N2 (pieces) | cell shape | partition-wall thickness (μm) | cell density (cells/cm$^2$) |
| --- | --- | --- | --- | --- | --- | --- | --- | --- | --- | --- | --- |
| Ex. 1 | 305 | 60 | 8 × 8 | 54 | regular hexagon | 300 | 47 | 6 | regular hexagon | 300 | 47 |
| Ex. 2 | 330 | 60 | 8 × 8 | 49 | regular hexagon | 180 | 47 | 11 | regular hexagon | 180 | 47 |
| Ex. 3 | 144 | 16 | 4 × 4 | 12 | regular hexagon | 200 | 31 | 4 | regular hexagon | 200 | 31 |
| Ex. 4 | 267 | 45 | 7 × 7 | 32 | regular hexagon | 300 | 47 | 13 | regular hexagon | 300 | 47 |
| Ex. 5 | 89 | 9 | 3 × 3 | 5 | regular hexagon | 250 | 93 | 4 | regular hexagon | 250 | 93 |
| Ex. 6 | 51 | 4 | 2 × 2 | 2 | regular hexagon | 150 | 47 | 2 | regular hexagon | 300 | 62 |
| Ex. 7 | 330 | 60 | 8 × 8 | 47 | regular hexagon | 300 | 62 | 13 | regular hexagon | 250 | 15 |
| Ex. 8 | 89 | 9 | 3 × 3 | 8 | regular hexagon | 400 | 47 | 1 | regular hexagon | 250 | 15 |
| Ex. 9 | 267 | 45 | 7 × 7 | 28 | regular hexagon | 250 | 15 | 17 | regular hexagon | 400 | 47 |
| Ex. 10 | 144 | 16 | 4 × 4 | 14 | regular hexagon | 200 | 47 | 2 | regular hexagon | 180 | 47 |
| Ex. 11 | 305 | 60 | 8 × 8 | 42 | regular hexagon | 180 | 47 | 18 | long hexagon | 180 | 47 |
| Ex. 12 | 356 | 77 | 9 × 9 | 67 | regular hexagon | 150 | 31 | 10 | long hexagon | 150 | 31 |
| Ex. 13 | 191 | 25 | 5 × 5 | 15 | regular hexagon | 200 | 47 | 10 | long hexagon | 200 | 47 |
| Ex. 14 | 229 | 32 | 6 × 6 | 20 | regular hexagon | 360 | 47 | 12 | long hexagon | 360 | 47 |
| Ex. 15 | 144 | 16 | 4 × 4 | 8 | regular hexagon | 250 | 93 | 8 | long hexagon | 250 | 93 |
| Comp. Ex. 1 | 305 | 60 | 8 × 8 | 60 | regular hexagon | 300 | 47 | — | — | — | — |
| Comp. Ex. 2 | 144 | 16 | 4 × 4 | 15 | regular hexagon | 300 | 47 | 1 | regular hexagon | 200 | 31 |
| Comp. Ex. 3 | 191 | 25 | 5 × 5 | 2 | regular hexagon | 250 | 15 | 2 | regular hexagon | 400 | 47 |

TABLE 1-continued

| | | | 1st honeycomb segment | | | | 2nd honeycomb segment | | | |
|---|---|---|---|---|---|---|---|---|---|---|
| | honeycomb structure diameter (mm) | total number Nall (pieces) | arrangement (columns' rows) | number N1 (pieces) | cell shape | partition-wall thickness (μm) | cell density (cells/cm²) | number N2 (pieces) | cell shape | partition-wall thickness (μm) | cell density (cells/cm²) |
| Comp. Ex. 4 | 267 | 45 | 7 × 7 | 21 | regular hexagon | 300 | 62 | 4 | long hexagon | 300 | 62 |
| Comp. Ex. 5 | 305 | 60 | 8 × 8 | 55 | regular hexagon | 250 | 15 | 5 | long hexagon | 250 | 15 |

TABLE 2

| | structure of 2nd honeycomb segment | | | | | isostatic pressure | |
|---|---|---|---|---|---|---|---|
| | 90° intersection of diagonal lines | number N2/total number Nall (%) | surrounding 1st segments (pieces) | number at circumferential part (outer diameter 20%) | number at center part (outer diameter 40%) | strength test ratio of isostatic strength | loss test pressure loss ratio |
| Ex. 1 | intersected | 10 | 4 | 1 | 5 | 1.1 | 0.995 |
| Ex. 2 | intersected | 18 | 4 | 3 | 5 | 1.2 | 0.994 |
| Ex. 3 | intersected | 25 | 3 | 2 | 2 | 1.2 | 0.993 |
| Ex. 4 | intersected | 29 | 4 | 4 | 5 | 1.19 | 0.991 |
| Ex. 5 | intersected | 44 | 3 | 3 | 1 | 1.29 | 0.991 |
| Ex. 6 | intersected | 50 | 2 | 2 | 2 | 1.32 | 0.955 |
| Ex. 7 | intersected | 22 | 4 | 12 | 6 | 1.18 | 0.992 |
| Ex. 8 | intersected | 11 | 4 | 0 | 1 | 1.12 | 0.993 |
| Ex. 9 | intersected | 38 | 4 | 9 | 4 | 1.26 | 0.991 |
| Ex. 10 | intersected | 13 | 4 | 0 | 2 | 1.15 | 0.993 |
| Ex. 11 | intersected | 30 | 3 | 12 | 6 | 1.23 | 0.991 |
| Ex. 12 | intersected | 13 | 4 | 5 | 5 | 1.13 | 0.994 |
| Ex. 13 | intersected | 40 | 3 | 6 | 4 | 1.29 | 0.988 |
| Ex. 14 | intersected | 38 | 2 | 8 | 4 | 1.24 | 0.990 |
| Ex. 15 | intersected | 50 | 4 | 0 | 2 | 1.34 | 0.993 |
| Comp. Ex. 1 | not intersected | — | — | — | — | 1 | 1.000 |
| Comp. Ex. 2 | not intersected | 6 | 4 | 0 | 1 | 1 | 1.000 |
| Comp. Ex. 3 | not intersected | 8 | 4 | 1 | 1 | 1 | 1.000 |
| Comp. Ex. 4 | not intersected | 9 | 4 | 1 | 3 | 1 | 1.000 |
| Comp. Ex. 5 | not intersected | 8 | 4 | 2 | 3 | 1 | 1.000 |

For the honeycomb filter of Example 1, the "isostatic strength test" and the "pressure loss test" were conducted for evaluation by the following method. Table 2 shows the result.

[Isostatic Strength Test]

Isostatic strength was measured in accordance with the isostatic breaking strength testing specified at M505-87 of the automotive standard (JASO standard) issued by the Society of Automotive Engineers of Japan, Inc. Isostatic breaking strength is tested by placing a honeycomb structure in a rubber-made tubular container, which is sealed with an aluminum plate, and applying an isostatic pressure thereto in water. Isostatic strength measured by this isostatic breaking strength testing is indicated as a pressure (MPa) applied when the honeycomb structure breaks down. The field of "ratio of isostatic strength" in Table 2 shows the ratio of isostatic strength of the honeycomb structures of Examples and Comparative Examples to the isostatic strength of the standard honeycomb structure described below. A standard honeycomb structure means a honeycomb structure that is configured so that the extended line of one diagonal line that is imaginarily depicted in cells having a hexagonal shape in a first honeycomb segment and the extended line of one diagonal line that is imaginarily depicted in cells having a hexagonal shape in a second honeycomb segment are not orthogonal, in the honeycomb structures of Examples and Comparative Examples. For instance, the honeycomb structure of Comparative Example 1 corresponds to the "standard honeycomb structure" for the honeycomb structure of Example 1. The honeycomb structures having the "ratio of isostatic strength" that was 1.1 or more were accepted in the test.

[Pressure Loss Test]

Exhaust gas emitted from a diesel engine was flowed into a honeycomb structure, and soot was trapped with the partition wall of the honeycomb structure until the amount of the accumulated soot was 4 g/L. When the amount of accumulated soot reached 4 g/L, exhaust gas from the engine at 200° C. was flowed into the honeycomb structure at the flow rate of "the volume of honeycomb structure"×40000 Nm³/h. Then pressure in the inflow end face side and in the outflow end face side of the honeycomb structure was measured, and a pressure difference between them was calculated to obtain the pressure loss (kPa). The field of "pressure loss ratio" in Table 2 shows the ratio of the pressure loss of the honeycomb structures in Examples and Comparative Examples relative to the pressure loss of the standard honeycomb structures described below. A standard honeycomb structure means a honeycomb structure that is configured so that the extended line of one diagonal line that is imaginarily depicted in cells having a hexagonal shape in a first honeycomb segment and the extended line of one diagonal line that is imaginarily depicted in cells having a hexagonal shape in a second honeycomb segment are not orthogonal, in the honeycomb structures of Examples and Comparative Examples. For instance, the honeycomb structure of Comparative Example 1 corresponds to the "standard honeycomb structure" for the honeycomb structure of Example 1. The honeycomb structures having the "pressure loss ratio" that was 0.995 or less were accepted in the test.

Examples 2 to 15

In Examples 2 to 15, the honeycomb structures were manufactured while changing their first honeycomb segments and second honeycomb segments as in Table 1 and Table 2. In these examples, the second honeycomb segments were arranged as in Table 2.

Comparative Examples 1 to 5

In Comparative Examples 1 to 5, the honeycomb structures were manufactured while changing their first honeycomb segments and second honeycomb segments as in Table 1 and Table 2. In Comparative Example 1, a single type of honeycomb segments were used, and all of the cells in these honeycomb segments were arranged in the same manner to manufacture the honeycomb segment bonded body. In Comparative Examples 2 to 5, their first honeycomb segments and second honeycomb segments were arranged so that the extended lines of the diagonal lines were not orthogonal.

For the honeycomb structures of Examples 2 to 15, the "isostatic strength test" and the "pressure loss test" were conducted for evaluation by the method similar to Example 1. Table 2 shows the result.

Results

The honeycomb structures of Examples 1 to 15 had the ratio of isostatic strength of 1.1 or more, and so had improved isostatic strength. The honeycomb structures of Examples 1 to 15 had good results for the pressure loss test as well.

INDUSTRIAL APPLICABILITY

The honeycomb structure of the present invention can be used as a catalyst carrier for loading of catalyst to purify exhaust gas and a member for exhaust-gas purifying, such as a filter, to purify exhaust gas.

DESCRIPTION OF REFERENCE NUMERALS 1, 21, 41: partition wall, 2, 22, 42: cell, 2a, 22a, 42a: inflow cell, 2b, 22b, 42b: outflow cell, 4, 24, 44: honeycomb segment, 4a, 44a: first honeycomb segment, 4b, 24b, 44b: second honeycomb segment, 5, 25, 45: plugging portion, 11, 31, 51, 71: first end face, 12: second end face, 13: circumferential wall, 14, 34, 54, 74: bonding layer, 100, 200, 300, 400, 500: honeycomb structure, T1: extended line of diagonal line, T2: extended line of diagonal line

What is claimed is:

1. A honeycomb structure comprising:
a plurality of prismatic columnar shaped honeycomb segments;
a bonding layer mutually bonding side faces of the plurality of honeycomb segments; and
a circumferential wall disposed to surround the circumference of a honeycomb segment bonded body having the honeycomb segments arranged in a grid pattern and bonded with the bonding layer, wherein
each of the plurality of honeycomb segments has a porous partition wall disposed so as to surround a plurality of cells extending from a first end face to a second end face,
in each of the plurality of honeycomb segments, the cells in other than an outermost circumference of the honeycomb segment have a hexagonal shape in a section orthogonal to an extending direction of the cells,
the plurality of honeycomb segments include at least one first honeycomb segment and at least one second honeycomb segment,
in the state of the honeycomb segment bonded body bonded with the bonding layer, the second honeycomb segment is different from the first honeycomb segment in at least one of: a shape of the cells in the section; a size of the cells; and an arrangement direction of the cells to arrange the plurality of cells having the porous partition wall therebetween,
an extended line of one diagonal line that is imaginarily depicted in the cells having a hexagonal shape in the first honeycomb segment and an extended line of one diagonal line that is imaginarily depicted in the cells having a hexagonal shape in the second honeycomb segment are configured to be orthogonal, and
wherein the extended lines of the one diagonal line imaginarily depicted in the cells having a hexagonal shape in the first honeycomb segment and the second honeycomb segment are formed by intersecting the longest distance between opposite vertices of the hexagonal cells.

2. The honeycomb structure according to claim 1, wherein a ratio of the number N2 of the second honeycomb segment to the number Nall of all of the honeycomb segments making up the honeycomb segment bonded body is 10 to 50% in percentage.

3. The honeycomb structure according to claim 1, wherein in the honeycomb segment bonded body, all of the honeycomb segments disposed adjacent to side faces of the second honeycomb segment are the first honeycomb segments.

4. The honeycomb structure according to claim 1, wherein in the honeycomb segment bonded body, the number N2 of the second honeycomb segment is equal to or less than the number N1 of the first honeycomb segment, and
when viewing the honeycomb segment bonded body from the first end face side, the second honeycomb segment is present at least in a region of 20% of an outer diameter of the first end face from an outermost circumference of the first end face side of the honeycomb segment bonded body.

5. The honeycomb structure according to claim 1, wherein in the honeycomb segment bonded body, the number N2 of the second honeycomb segment is equal to or less than the number N1 of the first honeycomb segment, and
when viewing the honeycomb segment bonded body from the first end face side, the second honeycomb segment is present at least in a region of 40% of an outer diameter of the first end face from a center of gravity at the first end face side of the honeycomb segment bonded body.

6. The honeycomb structure according to claim 1, wherein in the honeycomb segment bonded body, the number N2 of the second honeycomb segment is equal to or less than the number N1 of the first honeycomb segment, and when viewing the honeycomb segment bonded body from the first end face side, the second honeycomb segment is present only in a region of 20% of an outer diameter of the first end face from an outermost circumference of the first end face side of the honeycomb segment bonded body.

7. The honeycomb structure according to claim 1, wherein in each of the plurality of honeycomb segments, the cells in other than an outermost circumference of the honeycomb segment have a regular hexagonal shape in a section orthogonal to the extending direction of the cells.

8. The honeycomb structure according to claim 1, wherein in the honeycomb segment bonded body, when viewing the honeycomb segment bonded body from the first end face side, the honeycomb segments other than the honeycomb segments placed at an outermost circumference of the honeycomb segment bonded body have a quadrangular shape or a hexagonal shape.

\* \* \* \* \*